July 15, 1924.
C. M. PETERSON
1,501,182
PROCESS AND APPARATUS FOR TREATING MILK
Filed Jan. 9, 1924   2 Sheets-Sheet 2
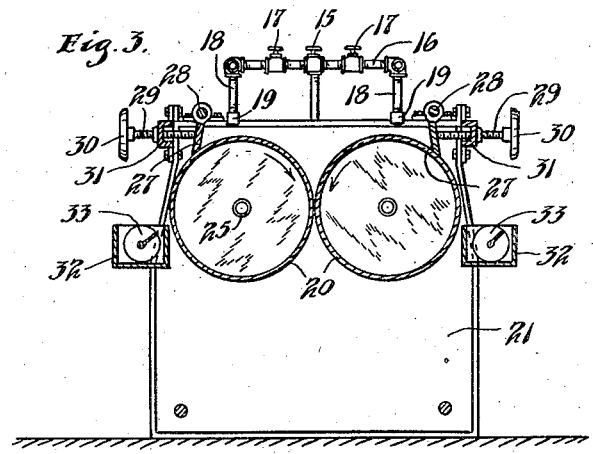
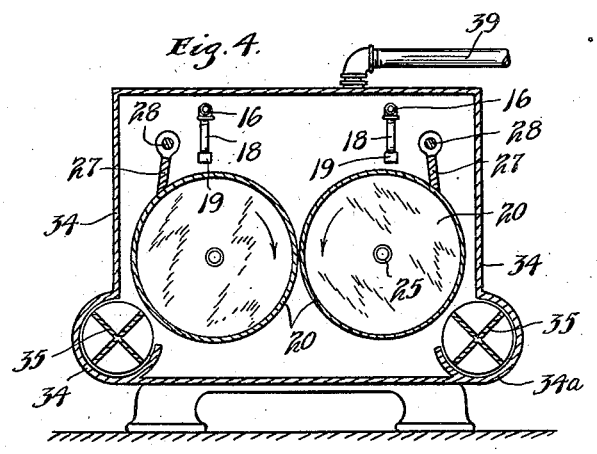
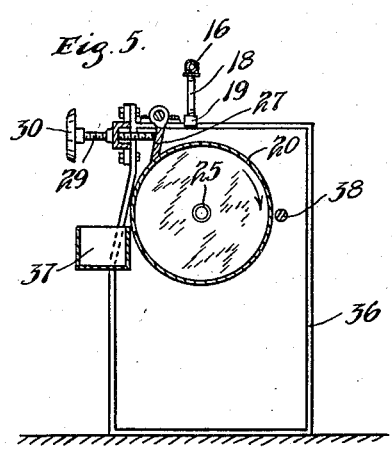
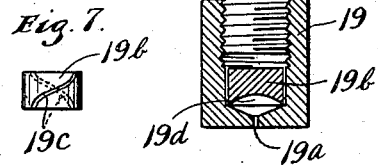
INVENTOR.
CHRIS M. PETERSON.
BY HIS ATTORNEY.
James F. Williamson Patented July 15, 1924.

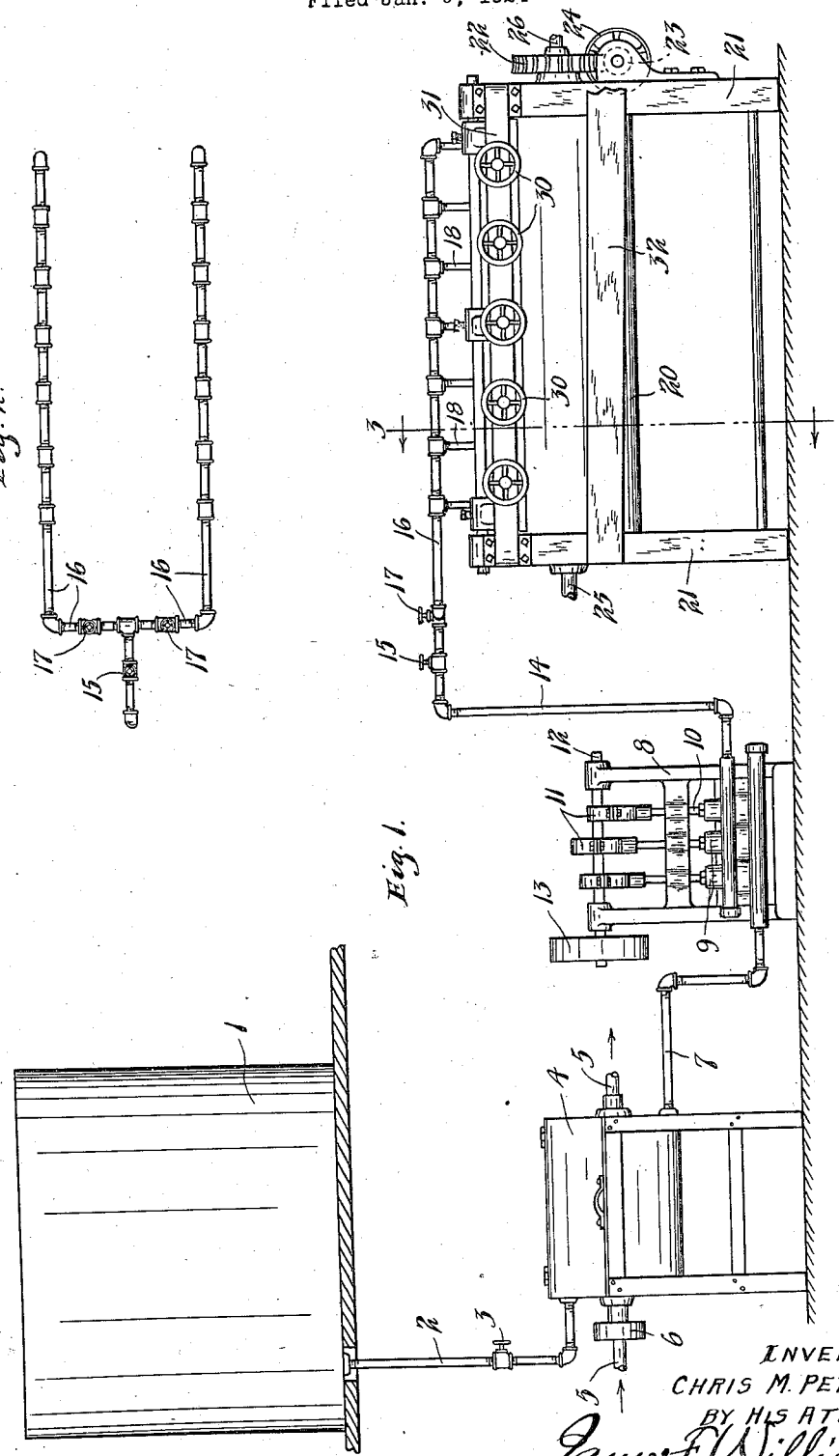

1,501,182

UNITED STATES PATENT OFFICE.

CHRIS M. PETERSON, OF MINNEAPOLIS, MINNESOTA.

PROCESS AND APPARATUS FOR TREATING MILK.

Application filed January 9, 1924. Serial No. 685,154.

*To all whom it may concern:*

Be it known that I, CHRIS M. PETERSON, a citizen of the United States, residing at Minneapolis, in the county of Hennepin and State of Minnesota, have invented certain new and useful Improvements in Processes and Apparatus for Treating Milk; and I do hereby declare the following to be a full, clear, and exact description of the invention, such as will enable others skilled in the art to which it appertains to make and use the same.

This invention relates to a method and apparatus for reducing fluid or semi-fluid substances to dry finely divided form, and while the invention is applicable to many substances, it particularly is designed for use with milk or buttermilk. At present the milk drying methods and devices can be classified, generally, into two classes those which spray the milk into a gaseous medium, such as heated air, and those which dry the milk on heated surfaces from which it is removed and pulverized.

The most difficult problem with the drum drying machines of the prior art has been that of getting the film or layer of milk onto the drum. In all of these machines that depend on the heating drum for the drying operation, the milk has heretofore been brought very gently into contact with the drying drum and has either been held in a pool adjacent the drum with the revolving drum passing through the pool or has flowed gently against the drum, the surplus not adhering to the drum being caught and retained in the pan. The capacity of the drum drying machine has heretofore been quite limited on account of not being able to secure the deposite of a good film of milk on a highly heated drum. In the machines where the milk is brought gently against the drum, if the drums are heated beyond a point corresponding to fifteen pounds pressure of steam, the milk would not adhere to the drum in sufficient quantities to make the machine practically operative. The tendency of liquid not to adhere to a heating surface is quite well known and most people have seen liquids bubble and run off of a hot stove or other heated metal surface. Where the heat of the drum is limited, the speed of the drum is limited as the milk must be dried in a practical operative machine. Another objection to a highly heated drum has been that the milk will scorch thereon, if allowed to rest in contact with the drum.

It is an object of the present invention therefore, to provide a novel method and apparatus for insuring an efficient adhesion of the milk and drum when the latter is highly heated so that the milk can quickly be dried and the drum rotated at comparatively high speed.

It is also an object of the invention to provide a novel method and apparatus in which the milk to be dried is placed under pressure and then discharged and projected at such pressure through a nozzle having a small aperture whereby the fat and liquid globules of the milk are finely broken up and the milk homogenized, the projected milk in such condition being received upon a moving heated surface whereby it instantly adheres to said surface and is quickly dried.

It is an object of the present invention to provide an improved method and apparatus for drying the fluid on a heated moving surface whereby a much larger amount of fluid can be dried in a given time.

It is a further object of the invention to provide such a method in which the milk is sprayed under high pressure in a fine jet against a heated moving surface forming a film thereon which is dried and then removed from said surface.

It is also an object of the invention to provide an apparatus comprising a heated moving surface, and means for spraying the milk under pressure in a fine jet against said moving surface, together with means for removing the resulting film from said surface when it is dried.

It is also an object of the invention to provide such a heated moving surface preferably in the form of a revoluble drum, together with means for spraying the milk in a fine jet thereon, and a member disposed in close proximity to said surface and extending across the same to reduce or eliminate the bubbles which might arise from the film on said surface.

It is more specifically an object of the invention to provide an apparatus comprising a pair of parallel heated drums with their surfaces substantially in contact at one point, which drums revolve toward each other, together with a plurality of nozzles extending along said drums, respectively, in advance of said point of contact, for forcibly projecting the milk thereon under pressure, and means for removing the dried milk from said drum, which apparatus may be enclosed in a chamber into which a partial vacuum can be produced.

These and other objects and advantages of the invention will be fully set forth in the following description made in connection with the accompanying drawings in which like reference characters refer to the same parts throughout the different views, and in which—

Fig. 1 is a somewhat diagrammatic view in side elevation of the apparatus used;

Fig. 2 is a plan view of a portion of the apparatus shown in Fig. 1;

Fig. 3 is a vertical section taken on the line 3—3 of Fig. 1, as indicated by the arrows;

Fig. 4 is a vertical section similar to that of Fig. 3 showing a modified form of apparatus;

Fig. 5 is a transverse vertical section of another modified form of apparatus;

Fig. 6 is a view in vertical section of a nozzle used showing the supply pipe therefor; and Fig. 7 is a view in side elevation of a portion of said nozzle, Figs. 6 and 7 being shown on an enlarged scale.

In carrying out the method of the invention, the milk is received and stored in a suitable tank 1 from whence it passes through the pipe 2 controlled by the valve 3 to a heating device 4. The heating device 4 may be of any suitable standard and well known form of heating device, the same being shown diagrammatically in the drawings and comprising a steam pipe 5 through which steam is passed in the direction indicated by the arrows to a coil or heating member connected to the plurality of rotating heating members contained in the device 4 which are rotated by means of a pulley 6. The milk, or other fluid to be dried, passes from the device 4 through the pipe 7 and is delivered to a pump 8. This pump has a plurality of cylinders 9 in which plungers 9 or 10, respectively, reciprocate, being driven through the eccentrics and straps 11 by the shaft 12 which carries a driving pulley 13. The pulley 13 will be connected to any suitable source of power, as will also the pulley 6. The milk is delivered from the pump 8 to the pipe 14 under considerable pressure and the pipe 14, which is controlled by the valve 15, communicates with two branch pipes 16, each of which is controlled by a valve 17. Connected to and depending from the pipes 16 are spaced pipes 18 which are equipped with delivery nozzles 19 at their lower ends adapted to deliver the fluid in a fine jet. The delivery nozzles 19 are disposed above and spaced some distance from a pair of drums 20. The nozzles are of special construction and, in connection with the pressure used, have an important function in applicant's method and apparatus. The drums 20 are mounted in a suitable framework 21 and are rotated toward each other by worm wheel gears 22 secured at the ends thereof, which are, in turn, driven by worm gears 23 secured to a shaft driven by a suitable pulley 24. Steam pipes 25 and 26 pass axially into and out of the drums 20 and are adapted to supply steam to the interior of said drums for heating the same. The nozzles 19 are disposed in a substantial vertical alinement with the axis of said drum, in the embodiment of the invention illustrated, the same being shown as disposed slightly at the outside of said vertical axis. A scraper blade 27 is swingingly mounted about a shaft 28 extending along the top of the frame 21 and journaled in suitable bearings secured at the ends thereof. The free edge of said blade 27 being beveled and sharpened, will lie closely against the outer surface of the drum 20 and said blades are adjustable toward and from the drum by screws 29 carrying hand wheels 30, said screws passing through suitable nuts secured in a bar 31 extending lengthwise of the frame 21. As shown in Fig. 3, there is a blade 27, shaft 28 and a plurality of adjusting screws for each of the drums 20, the lower edges of said blades contacting the said drums outwardly of the nozzles 19 in advance of said nozzles relative to the direction of rotation of said drums. The drums or rollers 20 have their peripheral surfaces substantially in contact along the line parallel to and in line with the axes of said drums. Receptacles or troughs 32 are disposed adjacent said drums at the outer sides thereof and preferably are equipped with screw conveyors 33 extending lengthwise therein.

The structure of the nozzles 19 is shown in detail in Figs. 6 and 7, in which it will be seen that each nozzle 19 is formed as a sleeve threaded onto the pipe 18 and having a small central aperture $19^a$ in its closed end. A plug or block $19^b$ is disposed in the sleeve 19 and substantially fits in a cylindrical recess in the bottom thereof. Said plug $19^b$ is equipped with helical grooves in its peripheral surface $19^c$ disposed at opposite sides thereof and extending from the top to the bottom of said plug. The plug 19ᵇ also has a semi-spherical recess 19ᵈ in its lower surface disposed above a conical recess in the bottom of sleeve 19 with which latter recess aperture 19ᵃ communicates.

The milk is discharged through the nozzles 19 under pressure and this pressure, together with the small passages through the small aperture leading from the nozzles, acts to break up the liquid and fat globules of the milk so that the milk as projected from the nozzles comprising a multiplicity of very fine particles.

In carrying out the method of the present invention in the apparatus described, the milk will be heated in the heating device 4 and will be furnished under pressure to the pipes 16 and 18. A pump having a plurality of plunger is used so that a substantially uniform pressure is obtained. Steam will be passed into the drums 20 and said drums rotated toward each other in the direction indicated by the arrows in Fig. 3 by power applied to the pulley 24. The valves are now open so that the milk will be projected in fine jets from the nozzles 19 onto the peripheral surface of drums 20. The milk forms a thin film on said heating drums and passes around the same. Any bubbles rising in the film will be eliminated or reduced as the surfaces of the drums pass the point of their closest proximity and the film of milk will be uniform on said drums after passing said point. The film of milk is retained on the drums until it reaches the blades or members 31, by means of which it is scraped from the drums and falls into the troughs 32. From the drums 32 the milk which is now in dried form, is conveyed to suitable grinding or pulverized apparatus. This pulverizing operation and apparatus are well known and old in the art and the same are not illustrated. By spraying the fluid or milk forcibly against the surface of the drums 20, an intimate contact is obtained between the milk and said surface and said milk instantly sticks to the drum and is quickly dried. There is practically no bubbling of the milk or the film on said surfaces. It is well known that if a drop of water is dropped onto a heated surface, that it does not stick to said surface but glides about and bubbles on the same. This action is eliminated in applicant's process.

By having the milk under pressure and projecting the same under pressure in a fine jet through the small aperture in the nozzle 19, a homogenizing effect is had thereon and the fat and liquid globules are finely broken up so that the milk instantly adheres to the surface of the drums or cylinders and quickly is dried. A very intimate contact is thus obtained between the milk and the surface of the drums. A pressure of from 500 to 2,300 pounds per square inch is placed on the milk during the spraying operation. If any bubbles do rise on the film, as stated, they are eliminated by passing between the rollers where they are most nearly in contact.

With applicant's method and apparatus, the drums can be heated to a higher degree and rotated more rapidly than with the prior methods and apparatus where the milk was merely gently discharged against or poured above the rolls at their points of contact. The maximum production on one of the prior double drum machines using the prior method was 33 pounds of dried milk per hour. With the present method and apparatus, this production has been increased to a maximum of 123 pounds per hour. It will thus be seen what a great advance applicant has made in the drying art.

In Fig. 4 an apparatus is shown in which the drums 20, nozzles 19, pipes 18 and 16 are also used in connection with the other apparatus shown in Fig. 1. A casing 34, however, extends about the drums, blades 27 and pipes 16, 18 and 19, the milk being supplied to the pipe 16 by the pipe 15 which passes through the casing 34. Troughs 34ᵃ are formed at the outer sides of and below the drums 20 having therein the conveyors 35. The casing 34 is made air tight and is adapted to have a partial vacuum formed therein by exhausting the air through a pipe 37 which will be connected to a suitable air pump or other suction means.

The method used in operating the apparatus, Fig. 4, is the same as described, except that the drying of the milk or fluid is also accomplished by the partial vacuum as well as by the heating drums 20. With the vacuum chamber formed by casing 34 the boiling point of the milk can be lowered therein so that the milk is dried without being exposed to as high a temperature as where the vacuum chamber is not used.

In Fig. 5, a device is shown comprising only one roller 20 mounted in a suitable frame 36, which roll is equipped with the blades 27 and adjusting screws 29 already described. The milk is delivered to the drums 20 through the nozzles 19 and pipes 16 and 18 in connection with the other apparatus shown in Fig. 1. The milk removed by the blades 27 will be collected in the trough 37. A member 38 extends longitudinally of the drums 20 in close proximity thereto and when the milk is sprayed onto the drums, as above described, said member 38 will act as does the other roll 20, to eliminate or reduce any bubbles which might arise in the film and to insure a uniform film on the drum. While the member 38 may take various forms, in the embodiment of the invention illustrated, it is shown as a cylindrical rod.

From the above description it is seen that applicant has provided a greatly improved method and apparatus for drying milk or other fluid or semi-fluid material. The product obtained is of high quality and with the use of the method and apparatus, of the invention it is, as above set forth, possible to greatly increase the amount of dry milk or other material produced in a given time. The invention has been thoroughly demonstrated in several drying factories and found to be very successful and efficient.

While as above stated, the pressure now being used is between 500 pounds and 2,300 pounds per square inch, more or less efficient results could be obtained with a lower pressure, especially by decreasing the speed of the drum or drums. The invention comprises any considerable pressure adequate to forcibly project the milk in a minute jet onto the heated drum.

It will, of course, be understood that various changes may be made in the form, details, arrangement and proportion of the apparatus, as well as in the steps and sequence of the steps of the method, without departing from the scope of applicant's invention, which, generally stated, consists in a device and method capable of carrying out the objects above stated, such as shown and described and set forth in the appended claims.

What is claimed is:

1. The method of drying milk or other fluid or semi-fluid material comprising placing the milk under pressure, forcibly projecting the milk under pressure in a series of minute jets against a heated surface to form a thin film on said surface, retaining said film on said surface until the same is dried, and then removing said film from said surface.

2. In a method of drying milk or other fluid or semi-fluid material, the steps of placing the material under pressure, and forcibly projecting the material under pressure in a series of minute jets against a heated surface to form a thin film on said surface.

3. The process of drying milk or similar fluid or semi-fluid material comprising placing said milk under pressure, passing said milk through a series of minute discharge openings under pressure to break up the fat and liquid globules whereby said milk is homogenized and receiving said milk so projected upon a heated surface whereby said milk adheres instantly to said surface permitting said milk to remain on said surface until substantially dry and then removing the same from said surface.

4. The method of drying milk or similar material consisting in placing said milk under pressure of fifty pounds per square inch or more, projecting said milk under said pressure in a series of minute jets into contact with a heated movable surface whereby it instantly adheres to said surface, retaining said material on said surface until dry and then removing the same from said surface.

5. The method of producing dried milk or similar material which comprises heating the milk, placing the same under pressure and projecting the milk under pressure in a series of minute jets against a moving heated surface to form a thin film thereon, passing said film and surface in close proximity to a member extending thereacross, to bring said film to substantially a uniform thickness, retaining said film on said surface until the same is dried and then removing said dried milk from said surface.

6. An apparatus for drying milk or other fluid material comprising means for placing the milk under pressure, a member having a surface, means for heating said drying surface, means for projecting said milk under pressure against said surface in minute jets to form a film thereon, and means for removing said film from said surface after the same is dried.

7. An apparatus for drying milk or other fluid or semi-fluid material comprising means for placing milk under pressure, a member having a movable peripheral surface, means for heating said surface, means projecting said milk at said pressure in a multiplicity of minute jets against said surface to form a film thereon, means for removing said film from said surface when dry, and a casing surrounding said member and adapted to have a partial vacuum formed therein.

8. An apparatus for drying milk or other fluid material comprising means for placing the milk under high pressure, a member having a movable peripheral surface, means for heating said surface, a conduit connected with said first mentioned means having a series of nozzles extending therefrom disposed along said surface, said nozzles having minute discharge openings and being spaced from said member, whereby said milk is discharged at said high pressure from said nozzles against said member and adheres thereto and is dried, and means for removing said material from said member.

9. The structure set forth in claim 5, and means extending in close proximity to said drum past which said film travels to reduce any bubbles rising thereon.

10. An apparatus for drying milk or other fluid or semi-fluid material having in combination, means for placing the milk under pressure, a pair of parallel revoluble drums having their peripheral surfaces in close proximity and revolving toward each other, a plurality of nozzles extending lengthwise of each drum in advance of their line of close proximity and having minute discharge openings adapted forcibly to project minute jets of milk against said drums, respectively, to form a thin film thereon, means for heating said drums, and means in advance of said nozzles for removing the film when dry from said drums.

In testimony whereof I affix my signature.

CHRIS M. PETERSON.